US012638670B2

(12) United States Patent
King

(10) Patent No.: US 12,638,670 B2
(45) Date of Patent: May 26, 2026

(54) BOROSCOPE GUIDE FIXTURE

(71) Applicant: RTX Corporation, Farmington, CT (US)

(72) Inventor: Christopher R. King, Terryville, CT (US)

(73) Assignee: RTX Corporation, Farmington, CT (US)

( * ) Notice: Subject to any disclaimer, the term of this patent is extended or adjusted under 35 U.S.C. 154(b) by 164 days.

(21) Appl. No.: 18/588,196

(22) Filed: Feb. 27, 2024

(65) Prior Publication Data

US 2025/0271658 A1    Aug. 28, 2025

(51) Int. Cl.
*G02B 23/24* (2006.01)
*G01M 15/14* (2006.01)

(52) U.S. Cl.
CPC ......... *G02B 23/2492* (2013.01); *G01M 15/14* (2013.01)

(58) Field of Classification Search
CPC ........... G02B 23/2492; G02B 23/2476; G01M 15/14; F01D 21/003; F01D 25/285; G01N 2021/9542; G01N 21/954
See application file for complete search history.

(56) References Cited

U.S. PATENT DOCUMENTS 4,011,017 A * 3/1977 Feuerstein ............ F01D 21/003
356/241.6
5,028,117 A * 7/1991 Muhlenkamp-Becker ..................
G02B 23/2476
385/117

| | | | |
|---|---|---|---|
| 5,335,061 A | 8/1994 | Yamamoto et al. | |
| 9,715,100 B2 * | 7/2017 | Konomura | G01N 21/954 |
| 10,598,917 B2 | 3/2020 | Chowaniec et al. | |
| 2015/0002841 A1 * | 1/2015 | Konomura | F01D 25/285 |
| | | | 356/241.6 |
| 2024/0302644 A1 | 9/2024 | Peters | |

OTHER PUBLICATIONS

EP Search Report for EP Patent Application No. 25160320.5 dated Jul. 8, 2025.

* cited by examiner

*Primary Examiner* — Jonathan M Hansen
(74) *Attorney, Agent, or Firm* — Getz Balich LLC

(57) ABSTRACT

A boroscope guide fixture is provided and includes a boroscope, a first section disposed about the boroscope and including first expandable components, first elastics constraining the first expandable components and first concave ends, second sections disposed about the boroscope and third sections. The second sections respectively include second expandable components, second elastics constraining the second expandable components, first convex ends to register with the first concave ends and second concave ends. The third sections are movably affixed to the boroscope and respectively include second convex ends to register with the second concave ends. The boroscope is operable to draw the third sections toward the second sections whereupon registration of the second convex and concave ends expands the second expandable components against the second elastics and registration of the first convex and concave ends expands the first expandable components against the first elastics.

18 Claims, 4 Drawing Sheets

600

601
Forming opening

602
Installing boroscope into boroscope guide fixture

603
Inserting boroscope guide fixture through opening

604
Operating boroscope to expand boroscope guide fixture

605
Performing inspection

606
Operating boroscope to retract boroscope guide fixture

607
Removing boroscope guide feature from opening

BOROSCOPE GUIDE FIXTURE

BACKGROUND

Exemplary embodiments of the present disclosure relate generally to inspection tools and, in some embodiments, an inspection tool that includes a boroscope guide fixture.

A gas turbine engine generates power from combustion of fuel and air. Air is drawn into the gas turbine engine through an inlet and is compressed in a compressor. Compressed air is then mixed with fuel and combusted in a combustor to produce high-temperature and high-pressure working fluid. The working fluid is directed to a turbine where the working fluid is expanded and aerodynamically interacts with turbine vanes and blades. The expanded working fluid can be exhausted to generate thrust in an engine. The aerodynamic interaction of the working fluid with the turbine blades and vanes causes turbine disks, to which the blades are attached, to rotate. This in turn causes a rotor to rotate. The rotation of the rotor can be used to operate the compressor, to rotate a fan at the inlet and to generate electricity.

Routine inspection of gas turbine engines is often important to confirm that all of its component parts are in good condition and working properly. Therefore, a continuing need exists for improvements inspection tools and processes.

BRIEF DESCRIPTION

According to an aspect of the disclosure, a boroscope guide fixture is provided and includes a boroscope, a first section disposed about the boroscope and including first expandable components, first elastics constraining the first expandable components and first concave ends, second sections disposed about the boroscope and third sections. The second sections respectively include second expandable components, second elastics constraining the second expandable components, first convex ends to register with the first concave ends and second concave ends. The third sections are movably affixed to the boroscope and respectively include second convex ends to register with the second concave ends. The boroscope is operable to draw the third sections toward the second sections whereupon registration of the second convex and concave ends expands the second expandable components against the second elastics and registration of the first convex and concave ends expands the first expandable components against the first elastics.

In accordance with additional or alternative embodiments, the first expandable components include a first partially-cylindrical component having an outer portion defining grooves in which the first elastics are seatable and a second partially-cylindrical component having an outer portion defining grooves in which the first elastics are seatable.

In accordance with additional or alternative embodiments, the outer portions of the first and second semi-cylindrical components include compliant material.

In accordance with additional or alternative embodiments, the outer portions of the first and second semi-cylindrical components are knurled.

In accordance with additional or alternative embodiments, the first concave ends oppose one another and include inwardly tapered surfaces.

In accordance with additional or alternative embodiments, the second expandable components include a first partially-cylindrical component defining grooves in which the second elastics are seatable and a second partially-cylindrical component defining grooves in which the second elastics are seatable.

In accordance with additional or alternative embodiments, the first convex ends for each of the second sections oppose one another and include outwardly tapered surfaces and the second concave ends for each of the second sections oppose one another and include inwardly tapered surfaces.

In accordance with additional or alternative embodiments, the second convex ends for each of the third sections oppose one another and include outwardly tapered surfaces.

In accordance with additional or alternative embodiments, the first and second elastics each include o-rings.

In accordance with additional or alternative embodiments, the boroscope includes a sensing element protruding from one of the third sections.

In accordance with additional or alternative embodiments, the third sections are threadably engageable with the boroscope and the boroscope is operable by rotation.

In accordance with additional or alternative embodiments, the third sections are slidable along an outer surface of the boroscope and the boroscope includes a plug by which the third sections are slid along the outer surface of the boroscope and a locking element to hold the plug in place relative to the outer surface of the boroscope.

According to an aspect of the disclosure, a boroscope guide fixture is provided and includes a boroscope configured to inspect a gas turbine engine cavity, a first section disposed about the boroscope and including first expandable components, first elastics constraining the first expandable components and first concave ends, second sections disposed about the boroscope and respectively including second expandable components, second elastics constraining the second expandable components, first convex ends to register with the first concave ends and second concave ends and third sections movably affixed to the boroscope and respectively including second convex ends to register with the second concave ends. The boroscope is operable to draw the third sections toward the second sections whereupon registration of the second convex and concave ends expands the second expandable components against the second elastics and registration of the first convex and concave ends expands the first expandable components against the first elastics into rigid gas turbine engine components.

In accordance with additional or alternative embodiments, outer portions of the first expandable components include compliant material for gripping onto the rigid gas turbine engine components.

In accordance with additional or alternative embodiments, outer portions of the first expandable components are knurled for gripping onto the rigid gas turbine engine components.

In accordance with additional or alternative embodiments, the boroscope includes a sensing element protruding from one of the third sections to inspect the gas turbine engine cavity.

In accordance with additional or alternative embodiments, the third sections are threadably engageable with the boroscope and the boroscope is operable by rotation.

In accordance with additional or alternative embodiments, the third sections are slidable along an outer surface of the boroscope and the boroscope includes a plug by which the third sections are slid along the outer surface of the boroscope and a locking element to hold the plug in place relative to the outer surface of the boroscope.

According to an aspect of the disclosure, a method of inspecting a cavity of a gas turbine engine is provided. The method includes forming an opening through rigid components of the gas turbine engine, installing a boroscope comprising a sensing element into a boroscope guide fixture, inserting the boroscope guide fixture through the opening to position the sensing element in the cavity, operating the boroscope to expand expandable components of the boroscope guide fixture into the rigid components, performing the inspecting of the cavity, operating the boroscope to retract the expandable components following completion of the inspecting and removing the boroscope guide fixture from the opening.

In accordance with additional or alternative embodiments, the operating of the boroscope to expand and retract the expandable components includes one of a rotational operation and a sliding operation.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
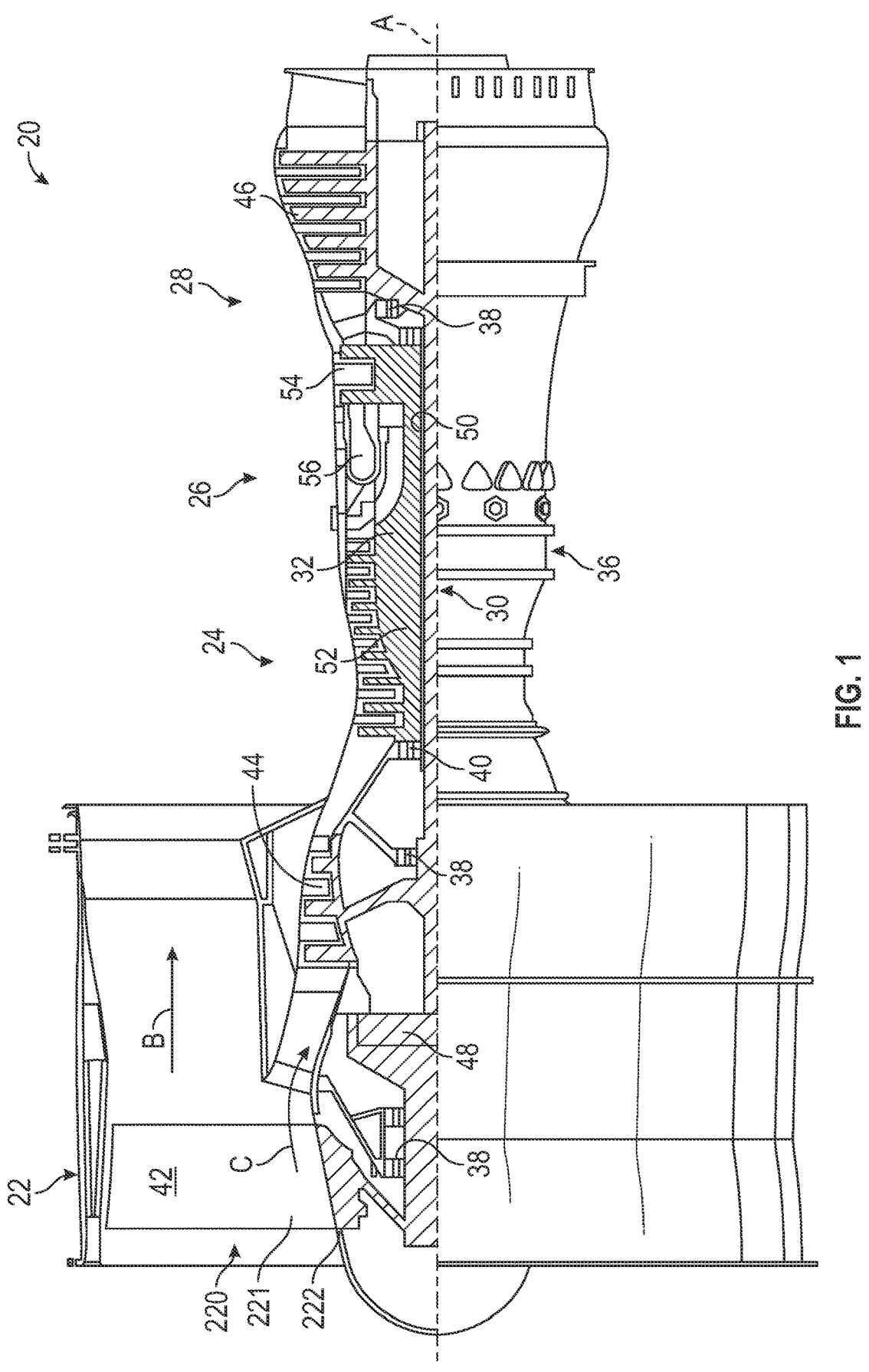
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Currently, inspections for second stage disks in a high-pressure turbine, such as the high-pressure turbine 54 of FIG. 1, require access to first-second high-pressure turbine rotor cavities. The tooling support that is required for these types of inspections often need to provide for usages of different sized tooling to prevent tooling location errors and to allow for quick changeovers. In certain cases, gas turbine engine product have been experiencing relatively high engine removals due to potential powder metal defects in high-pressure compressor/high-pressure turbine (HPC/HPT) disks. In these or other cases, guidance and support of inspection tools is required.

Accordingly, a need exists for tooling and tooling support that allows for tool guidance and support for inspection tools.

Therefore, as will be described below, a tool is provided that uses multiple segments that are slid onto a boroscope or articulating guide tube. The segments are constrained by o-rings or other similar features to prevent falling apart. A force is applied (using either threading or compression by pulling a tube) to the end furthest from the inspection end to cause a reaction which expands the segments. This locks the tool into the hole being inspected thus fixturing the probe for inspection purposes.

Figure 2:
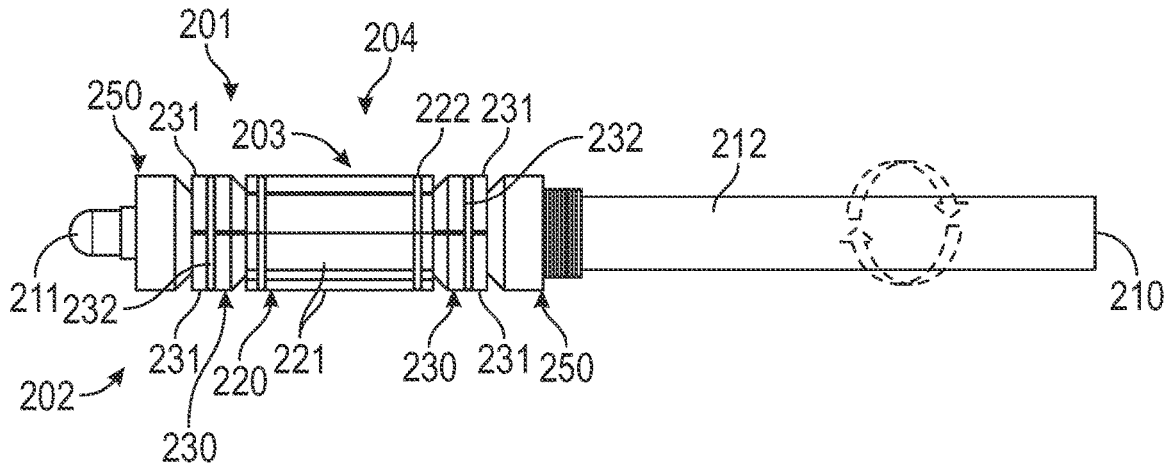
FIG. 2 is a side view of a boroscope guide fixture and a rotational boroscope in accordance with embodiments.
Figure 3:
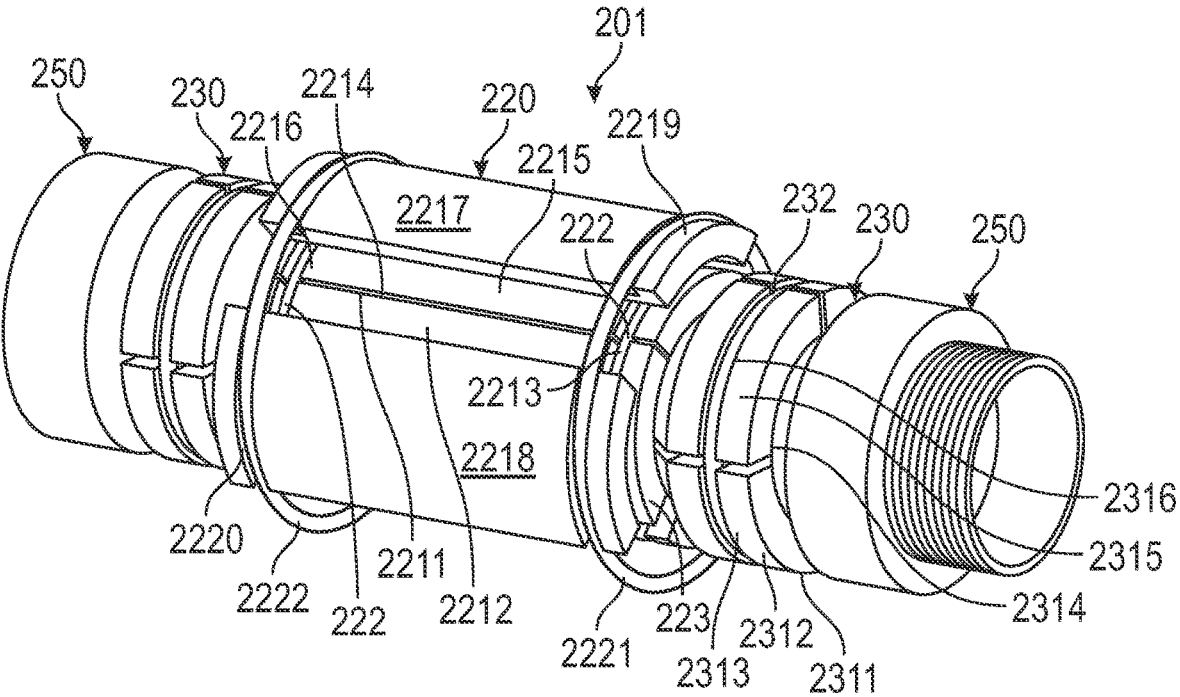
FIG. 3 is an enlarged perspective view of the boroscope guide fixture of FIG. 3 in accordance with embodiments.
Figure 4:
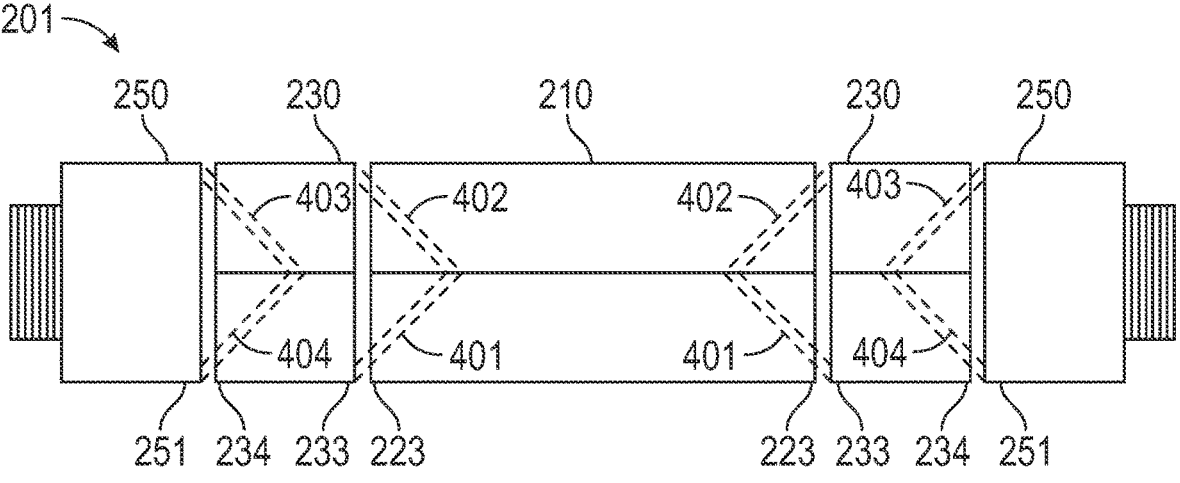
FIG. 4 is a side schematic illustration of the boroscope guide fixture of FIGS. 2 and 3.

With reference to FIGS. 2, 3 and 4, a boroscope guide fixture 201 is provided for inspecting a cavity 202 of a gas turbine engine, such as the gas turbine engine 20 of FIG. 1, via an opening 203 formed through rigid (or semi-rigid) components 204 of the gas turbine engine. The boroscope guide fixture 201 includes a boroscope 210 that is configured to inspect the cavity 202, a first central section 220, second lateral sections 230 and third end sections 250.

The first central section 220 is disposed about the boroscope 210 and includes first expandable components 221 that are configured to exhibit a retracted condition (see FIG. 2) and an expanded condition (see FIG. 3), first elastic elements 222 (e.g., o-rings or other similar features) that are configured to constrain the first expandable components 221 in the retracted condition and in the expanded condition and first concave ends 223 (see FIG. 4). The first concave ends 223 oppose one another and include inwardly tapered surfaces 401 (see FIG. 4).

The first expandable components 221 each include at least a first partially-cylindrical component 2211 having an outer surface 2212 defining grooves 2213 in which the first elastic elements 222 are seatable and a second partially-cylindrical component 2214 having an outer surface 2215 defining grooves 2216 in which the first elastic elements 222 are seatable. The first and second partially-cylindrical components 2211 and 2214 can each further include outer portions 2217 and 2218 defining additional grooves 2219 and 2220 in which additional first elastic elements 2221 and 2222 are seatable. The outer portions 2217 and 2218 can include compliant material or can be knurled for gripping onto the rigid (or semi-rigid) components 204.

The second lateral sections 230 are each disposed about the boroscope 210 and respectively include second expandable components 231 that are configured to exhibit a retracted condition (see FIG. 1) and an expanded condition (see FIG. 2), second elastic elements 232 (e.g., o-rings or other similar features) that are configured to constrain the second expandable components 231 in the retracted condition and in the expanded condition, first convex ends 233 (see FIG. 4) to register with the first concave ends 223 and second concave ends 234 (see FIG. 4). For each of the second lateral sections 230, the first convex ends 233 oppose one another and include outwardly tapered surfaces 402 (see FIG. 4). Also, for each of the second lateral sections 230, the second concave ends 234 oppose one another and include inwardly tapered surfaces 403 (see FIG. 4).

The second expandable components 231 each include at least a first partially-cylindrical component 2311 having an outer surface 2312 defining grooves 2313 in which the second elastic elements 232 are seatable and a second partially-cylindrical component 2314 having an outer surface 2315 defining grooves 2316 in which the second elastic elements 232 are seatable.

The third end sections 250 are movably affixed to the boroscope 210 and respectively include second convex ends 251 (see FIG. 4) to register with the second concave ends 234. For each of the third end sections 250, the second convex ends 251 oppose one another and include outwardly tapered surfaces 404 (see FIG. 4).

The boroscope 210 includes a sensing element 211 protruding from one of the third sections 250 to inspect the cavity 202 and one or more tubular elements 212. The one or more tubular elements protrude from the other of the third sections 250 and are operable to draw the third end sections 250 toward the second lateral sections 230 whereupon registration of the second convex ends 251 and the second concave ends 234 causes expansion of the second expandable components 231 against elastic biases of the second elastic elements 232 and whereupon registration of the first convex ends 233 and the first concave ends 223 causes expansion of the first expandable components 221 against elastic biases of the first elastic elements 222 into the rigid (or the semi-rigid) components 204.

As shown in FIGS. 2 and 3, the third sections 250 threadably engageable with the one or more tubular elements 212 of the boroscope 210. In these or other cases, the boroscope 210 is operable by relative rotation of the third sections 250 and the one or more tubular elements 212. That is, relative rotation of the third sections 250 and the one or more tubular elements 212 in a first rotational direction draws the third sections 250 toward and into the second lateral sections 230, which in turn causes the above-described expansion, whereas relative rotation of the third sections 250 and the one or more tubular elements 212 in a second rotational direction withdraws the third sections 250 away from the second lateral sections 230, which in turn causes retraction by the first second elastic elements 222 and 232.

Figure 5:
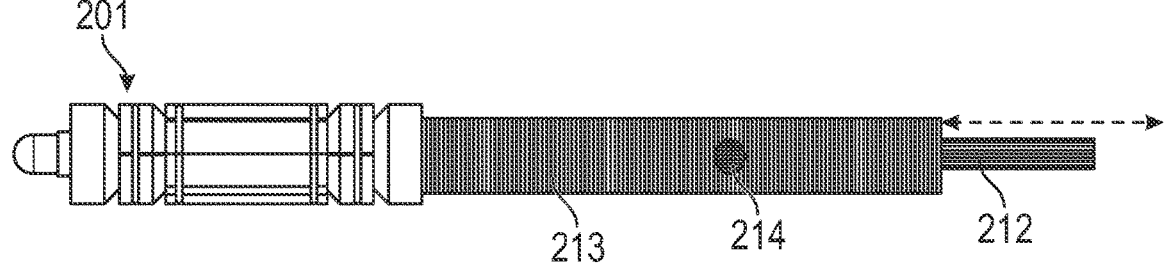
FIG. 5 is a side view of a boroscope guide fixture and a slidable boroscope in accordance with embodiments.

With reference to FIG. 5, the third sections 250 are slidable along an outer surface of the one or more tubular elements 212 of the boroscope 210. In these or other cases, the boroscope 210 can include a plug 213 by which the third sections 250 are slid along the outer surface of the one or more tubular elements 212 of the boroscope 210 and a locking element 214. The locking element 214 is configured to hold the plug 213 in place relative to the outer surface of the one or more tubular elements 212 of the boroscope 210 against the biases of the first and second elastic elements 222 and 232.

Figure 6:
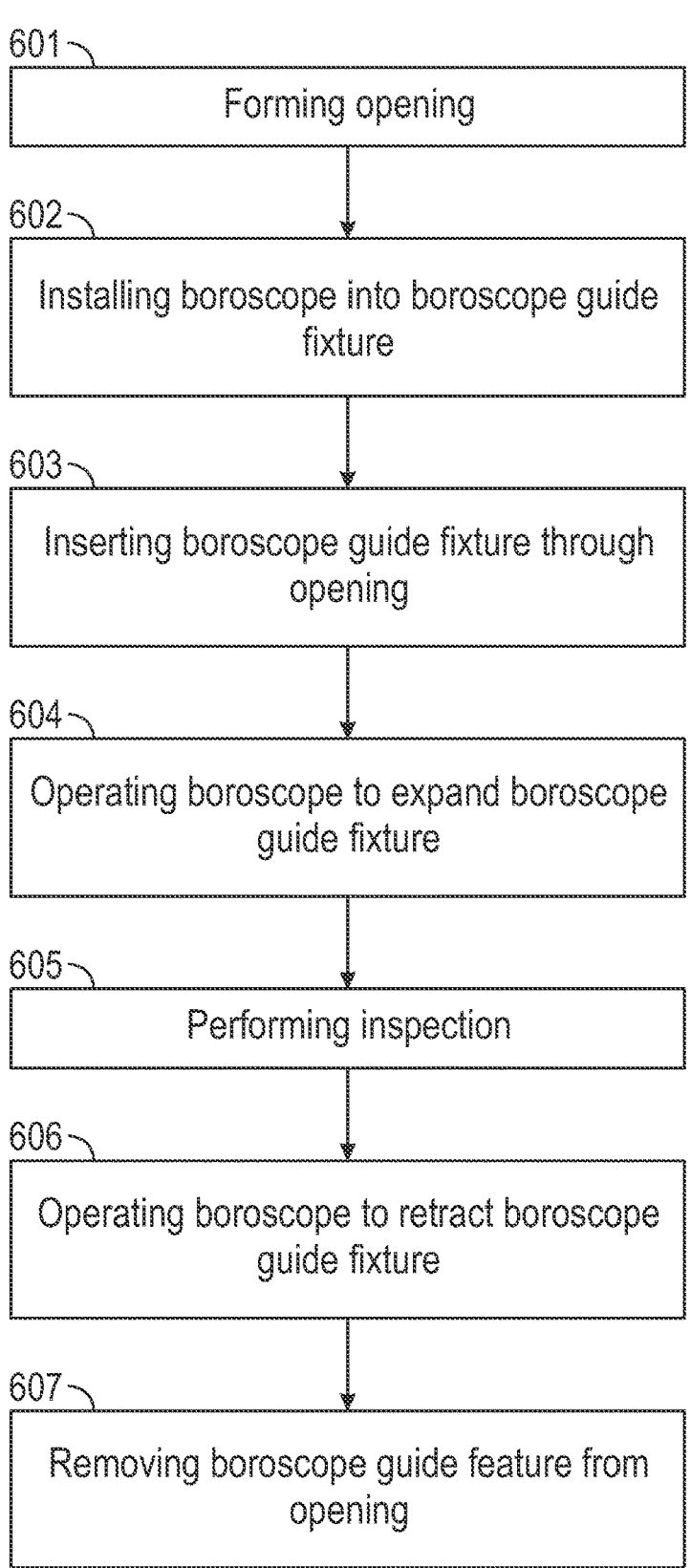
FIG. 6 is a flow diagram illustration a method of inspecting a cavity of a gas turbine engine in accordance with embodiments.

With reference to FIG. 6, a method 600 of inspecting a cavity of a gas turbine engine, such as the cavity 202 of FIGS. 2 and 3, is provided. The method 600 includes forming an opening through rigid components of the gas turbine engine, such as the opening 203 through the rigid components 204 of FIGS. 2 and 3 (block 601). The method 600 further includes installing a boroscope including a sensing element into a boroscope guide fixture as described above (block 602), inserting the boroscope guide fixture through the opening to position the sensing element in the cavity (block 603), operating the boroscope by rotational or sliding operations to expand expandable components of the boroscope guide fixture into the rigid components (block 604), performing the inspecting of the cavity (block 605), operating the boroscope to retract the expandable components following completion of the inspecting (block 606) and removing the boroscope guide fixture from the opening (block 607).

It is to be understood that although the description provided above relates to an inspection of a cavity of a gas turbine engine, this is not required and other embodiments exist. These include, but are not limited to, inspections of body cavities during surgical procedures in which the expandable components would expand into and becomes fixed by rigid internal components of a body, such as skeletal structures. In these cases, in particular, the expandable components can include compliant materials that are unlikely to damage those internal components of the body.

Technical effects and benefits of the features described herein are the provision of tool guidance and fixturing that will improve inspection tool capability. This will avoid cases in which engine time on a wing is limited by powder metal defects of compressor and turbine rotors and other similar problems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A boroscope guide fixture, comprising:
a boroscope;
a first section disposed about the boroscope and comprising first expandable components, first elastics constraining the first expandable components and first concave ends;
second sections disposed about the boroscope and respectively comprising second expandable components, second elastics constraining the second expandable components, first convex ends to register with the first concave ends and second concave ends; and
third sections movably affixed to the boroscope and respectively comprising second convex ends to register with the second concave ends,
the boroscope being operable to draw the third sections toward the second sections whereupon registration of the second convex and concave ends expands the second expandable components against the second elastics and registration of the first convex and concave ends expands the first expandable components against the first elastics.

2. The boroscope guide fixture according to claim 1, wherein the first expandable components comprise:
a first partially-cylindrical component having an outer portion defining grooves in which the first elastics are seatable; and
a second partially-cylindrical component having an outer portion defining grooves in which the first elastics are seatable.

3. The boroscope guide fixture according to claim 2, wherein the outer portions of the first and second semi-cylindrical components comprise compliant material.

4. The boroscope guide fixture according to claim 2, wherein the outer portions of the first and second semi-cylindrical components are knurled.

5. The boroscope guide fixture according to claim 1, wherein the first concave ends oppose one another and comprise inwardly tapered surfaces.

6. The boroscope guide fixture according to claim 1, wherein the second expandable components comprise:
a first partially-cylindrical component defining grooves in which the second elastics are seatable; and
a second partially-cylindrical component defining grooves in which the second elastics are seatable.

7. The boroscope guide fixture according to claim 1, wherein:
the first convex ends for each of the second sections oppose one another and comprise outwardly tapered surfaces, and
the second concave ends for each of the second sections oppose one another and comprise inwardly tapered surfaces.

8. The boroscope guide fixture according to claim 1, wherein the second convex ends for each of the third sections oppose one another and comprise outwardly tapered surfaces.

9. The boroscope guide fixture according to claim 1, wherein the first and second elastics each comprise o-rings.

10. The boroscope guide fixture according to claim 1, wherein the boroscope comprises a sensing element protruding from one of the third sections.

11. The boroscope guide fixture according to claim 1, wherein the third sections are threadably engageable with the boroscope and the boroscope is operable by rotation.

12. The boroscope guide fixture according to claim 1, wherein:
the third sections are slidable along an outer surface of the boroscope, and
the boroscope comprises a plug by which the third sections are slid along the outer surface of the boroscope and a locking element to hold the plug in place relative to the outer surface of the boroscope.

13. A boroscope guide fixture, comprising:
a boroscope configured to inspect a gas turbine engine cavity;
a first section disposed about the boroscope and comprising first expandable components, first elastics constraining the first expandable components and first concave ends;
second sections disposed about the boroscope and respectively comprising second expandable components, second elastics constraining the second expandable components, first convex ends to register with the first concave ends and second concave ends; and
third sections movably affixed to the boroscope and respectively comprising second convex ends to register with the second concave ends,
the boroscope being operable to draw the third sections toward the second sections whereupon registration of the second convex and concave ends expands the second expandable components against the second elastics and registration of the first convex and concave ends expands the first expandable components against the first elastics into rigid gas turbine engine components.

14. The boroscope guide fixture according to claim 13, wherein outer portions of the first expandable components comprise compliant material for gripping onto the rigid gas turbine engine components.

15. The boroscope guide fixture according to claim 13, wherein outer portions of the first expandable components are knurled for gripping onto the rigid gas turbine engine components.

16. The boroscope guide fixture according to claim 13, wherein the boroscope comprises a sensing element protruding from one of the third sections to inspect the gas turbine engine cavity.

17. The boroscope guide fixture according to claim 13, wherein the third sections are threadably engageable with the boroscope and the boroscope is operable by rotation.

18. The boroscope guide fixture according to claim 13, wherein:

the third sections are slidable along an outer surface of the boroscope, and the boroscope comprises a plug by which the third sections are slid along the outer surface of the boroscope and a locking element to hold the plug in place relative to the outer surface of the boroscope.

\* \* \* \* \*